United States Patent [19]

Krebs et al.

[11] Patent Number: 4,519,068
[45] Date of Patent: May 21, 1985

[54] METHOD AND APPARATUS FOR COMMUNICATING VARIABLE LENGTH MESSAGES BETWEEN A PRIMARY STATION AND REMOTE STATIONS OF A DATA COMMUNICATIONS SYSTEM

[75] Inventors: Jay Krebs, Crystal Lake; Thomas A. Freeburg, Arlington Heights, both of Ill.

[73] Assignee: Motorola, Inc., Schaumburg, Ill.

[21] Appl. No.: 512,801

[22] Filed: Jul. 11, 1983

[51] Int. Cl.³ ............................................... H04J 3/16
[52] U.S. Cl. ...................................... 370/82; 370/94; 370/110.1
[58] Field of Search ....................... 370/82, 83, 99, 92, 370/94, 110.1; 340/825.21

[56] References Cited

U.S. PATENT DOCUMENTS

| | | | |
|---|---|---|---|
| 3,774,217 | 11/1973 | Bonner et al. | 340/825.21 |
| 3,814,859 | 6/1974 | Vrba et al. | 370/58 |
| 3,855,422 | 12/1974 | Cadiou et al. | 370/82 |
| 4,001,693 | 1/1977 | Stackhouse et al. | 455/51 |
| 4,156,111 | 5/1979 | Downey et al. | 370/83 |
| 4,156,867 | 5/1979 | Bench et al. | 371/39 |
| 4,168,469 | 9/1979 | Parikh et al. | 370/83 |
| 4,225,919 | 9/1980 | Kyu et al. | 370/99 |
| 4,292,623 | 9/1981 | Eswaran et al. | 370/94 |
| 4,354,252 | 10/1982 | Lamb et al. | 364/900 |
| 4,369,443 | 1/1983 | Giallanza et al. | 340/825.47 |
| 4,379,946 | 4/1983 | Mizuno et al. | 178/3 |

OTHER PUBLICATIONS

Advanced Research Projects Agency; "The Application of Microprocessors in High Speed Portable Data Communications Terminals"; Fralick et al.; 1974, pp. 241-251.
"EIA Interim Standard, CIS-3 Communications Interim Standard", by Electronic Industries Association, Jul. 1981.

Primary Examiner—Douglas W. Olms
Assistant Examiner—Frank M. Scutch, III
Attorney, Agent, or Firm—Rolland R. Hackbart; Edward M. Roney; James W. Gillman

[57] ABSTRACT

A data communications system is described in which variable length messages are communicated between a general communications controller (GCC) and a plurality of portable and mobile radios. The variable length messages include a bit synchronization field, a message synchronization field and a plurality of channel data blocks for efficiently and reliably handling long strings of data or text. Each channel data block includes an information field, a parity field for error-connecting the information field and a channel state field indicating whether or not the radio channel is busy or free. The GCC is coupled to a cellular arrangement of channel communications modules (CCM's), which each include a radio transmitter and/or radio receiver. The mobile and portable radios communicate with the GCC by way of the CCM's.

10 Claims, 19 Drawing Figures

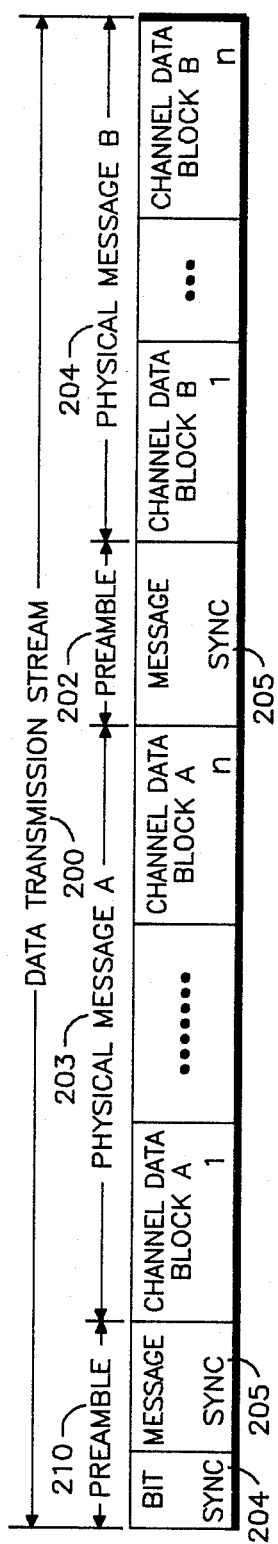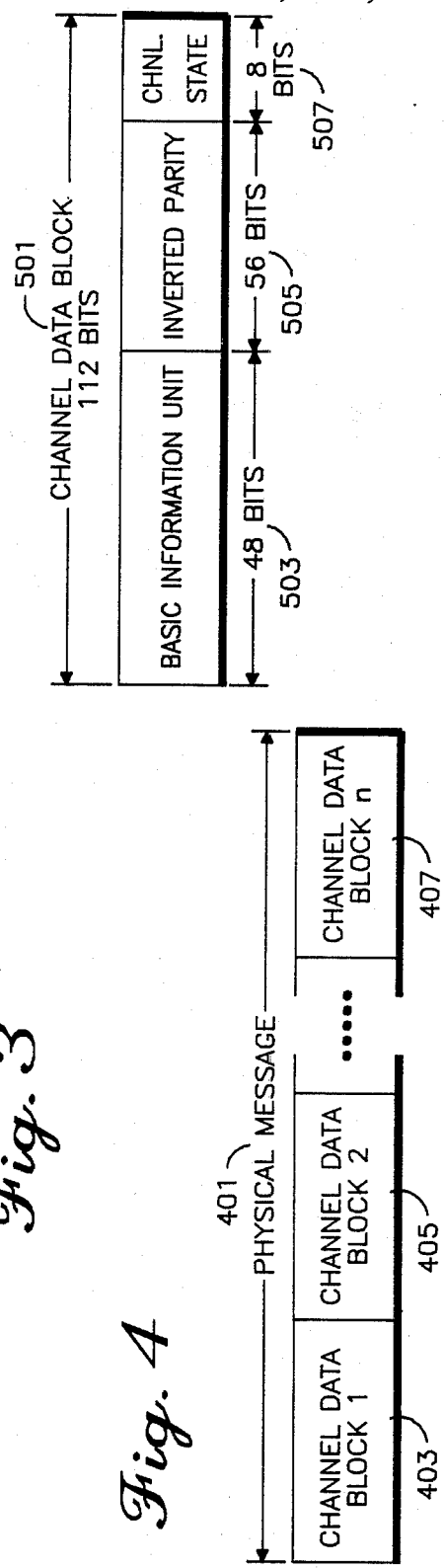

VARIABLE LENGTH MESSAGE STRUCTURE

VARIABLE LENGTH MESSAGE CONTROL REGISTER

METHOD AND APPARATUS FOR COMMUNICATING VARIABLE LENGTH MESSAGES BETWEEN A PRIMARY STATION AND REMOTE STATIONS OF A DATA COMMUNICATIONS SYSTEM

BACKGROUND OF THE INVENTION

The present invention relates generally to radio communications systems, and more particularly to an improved method and apparatus for communicating variable length messages between a primary station and remote stations of a data communications system.

In prior art data communications sytems, as exemplified by the system described in U.S. Pat. No. 4,156,867, messages communicated from a central station to mobile stations included a start code followed by one or more data blocks each including a parity word and a number of digital words with a data and parity portions. No information is provided in the first or second block as to the number of following blocks, and no provision was made for efficiently and reliably accomodating long strings of data. The bits of the data block were interleaved so as to be more tolerant of burst errors. However, the interleaving scheme of these prior art data communications systems typically rendered blocks susceptible to the loss of either a group of data bits or a group of parity bits due to burst errors. Furthermore, simultaneous transmissions from two or more mobile stations could interfere with one another such that neither was adequately received by the central station.

OBJECTS AND SUMMARY OF THE INVENTION

It is an object of the present invention to provide an improved method and apparatus for communicating variable length messages between a primary station and remote stations of a data communications system.

Briefly described, the present invention encompasses a signalling system for use in stations of a communications system for communicating variable length messages via a communications medium, such as a radio channel, between a primary station and a plurality of remote stations, such as portable and mobile radios. The signalling system includes a variable length message which is transmitted between an originating station and received by at least one destination station. The variable length message includes a bit synchronization field, a message synchronization field and a plurality of channel data blocks. The first channel data block includes an information field including at least one command and a station address, and a parity field coded from the information field according to a predetermined code. The second channel data block includes an information field including a block count indicating the number of following channel data blocks, a message sequence number incremented for each message and a check word, and a parity field coded from the information field according to a predetermined code. The third and following channel data blocks include an information field including data, and a parity field coded from the information field. The bits of the fields in each channel data block are interleaved such that consecutive bits of a field are separated by a predetermined number of bits.

BRIEF DESCRIPTION OF THE DRAWINGS

FIG. 2 is a diagram of data messages in a typical data stream.

FIG. 3 is a diagram of the preferred bit pattern of the message synchronization field in FIG. 2.

FIG. 4 is a diagram of the structure of the physical messages in FIG. 2.

FIG. 5 is a diagram of the structure of the channel data blocks in FIGS. 2 and 4.

DETAILED DESCRIPTION OF THE PREFERRED EMBODIMENTS

Figure 1:
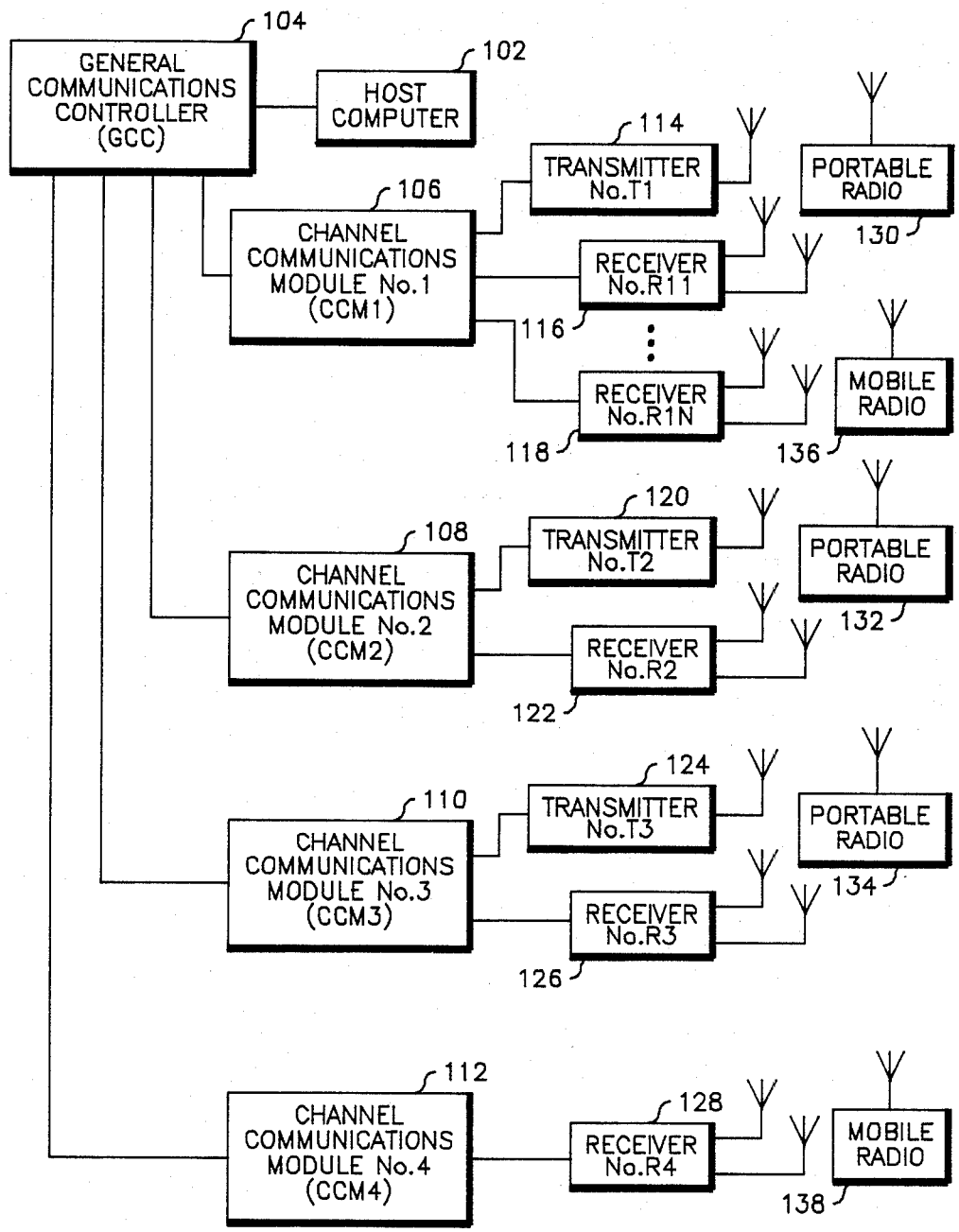
FIG. 1 is a block diagram of a data communications system that may advantageously utilize the present invention.

In FIG. 1, there is illustrated a data communications system that communicates message signals between a primary station, such as a general communications controller (GCC) 104, by way of a communications medium, such as a radio frequency (RF) communications channel, to a plurality of remote stations, such as portable radios 130, 132 and 134 and mobile radios 136 and 138. Although described in the context of a data only communications system, both data signals and analog signals such as voice signals can be communicated over the RF communications channel to the portable and mobile radios 130, 132, 134, 136 and 138. The data communications system covers a large geographical area which is divided into a plurality of cells or zones. Located throughout the geographical area are a number of channel communications modules (CCM) 106, 108, 110 and 112, which are each coupled to and control a number of RF signal transmitters 114, 120, and 124 and RF signal receivers 116, 118, 122, 126 and 128.

The RF communications channel is preferably comprised of first and second carrier signals which may be modulated with the message signals. Transmitters 114, 120 and 124 may be operative on the first carrier signal, while receivers 116, 118, 122, 126 and 128 may be operative on the second carrier signal of the radio communications channel. Each zone of the radio communications system is covered by an assigned one of the transmitters 114, 120 and 124 and by at least one of the receivers 116, 118, 122, 126 and 128. Transmitters 114, 120 and 124 and receivers 116, 118, 122, 126 and 128 may be any suitable commercially available transmitters and receivers such as those described in Motorola Instruction Manual 68P81013E65. CCM's 106, 108, 110 and 112 may be co-located with their corresponding transmitters and receivers or may be remotely located located and coupled to their corresponding transmitters and receivers by means of a suitable remote control system, such as, for example, the tone remote control system described in U.S. Pat. No. 3,577,080.

Portable radios 130, 132 and 134 may be either commercially available mobile radios of the type shown and described in Motorola instruction manual no. 68P81039E25 or commerically available hand-held portable radios of the type shown and described in U.S. Pat. Nos. 3,906,166 and 3,962,553 and in patent application Ser. No. 187,304 (now U.S. Pat. No. 4,486,624), entitled "Microprocessor Controlled Radiotelephone Transceiver", filed Sept. 15, 1980 and invented by Larry C. Puhl et al. Mobile radios may be commercially available radios of the type shown and described in Motorola instruction manual no. 68P81039E25. Portable and mobile radios 130, 132, 134, 136 and 138 each include a transmitter operable on the second carrier signal and a receiver operable on the first carrier signal. The transmitter and receiver in portable and mobile radios 130, 132, 134, 136 and 138 may be any suitable commercially available conventional transmitter and receiver, such as, for example, the transmitter and receiver described in Motorola instruction manual nos. 68P81039E25 and 68P81014C65. These and the other Motorola Instruction Manuals referenced herein are available from the Service Publications Department of Motorola, Inc., 1301 East Algonquin Road, Schaumburg, Ill. or from Motorola C & E Parts, 1313 East Algonguin Road, Schaumburg, Ill.

GCC 104 of the data communications system in FIG. 1 may be coupled to a host computer 102 which may control a number of GCC's 104 that are located in different geographical areas, such as, for example, different cities. Thus, host computer 102 may gather data from, and dispatch data to, portable and movbile radios located in several different cities. GCC 104 may be coupled to host computer 102 and CCM's 106, 108, 110, and 112 by means of commercially available modems and associated dedicated telephone lines.

GCC 104 in FIG. 1 transmits message signals to and receives message signals from portable and mobile radios 130, 132, 134, 136 and 138 by way of CCM's 106, 108, 110 and 112. The message signals may include a binary peramble, a predetermined synchronization word, an information word containing a command, status or data, and one or more data words.

As shown in FIGS. 1 and 2, data messages between GCC 104 and portable and mobile radios 130, 132, 134, 136, and 138 are structured as a stream of binary information (i.e., bits). The preferred embodiment of the signalling system utilizes digital frequency modulation at 4800 bits per second.

This data transmission stream 200 in FIG. 2 can contain one or more physical messages 230, 204. A physical message 203 or 204 within the data transmission stream 200 is preceeded by a preamble 201 or 202. The preamble 201 or 202 is required to establish bit and message synchronization between the transmitting and receiving ends of the link.

The preamble 201 or 202 assumes different forms depending on its position in the data transmission stream 200. The initial preamble 201, which occurs once at the beginning of a data transmission stream, contains one of two fields: bit sync field 204 and message sync field 205.

The bit sync field 204 is a predefined pattern of at least twenty bits of alternating 1's and 0's, ending in a zero. Bit sync is used only at the beginning of a data transmission stream.

The message sync field 205 consists of a pattern of 40 bits that mark the beginning of a physical message. Each physical message in a data transmissiion stream is preceded by a message sync field 205. The message sync field 205 precedes all physical messages in the data transmission stream. The preferred bit pattern of the message sync field 205 is shown in FIG. 3.

A physical message 401 (refer to FIG. 4) is composed of one or more channel data blocks (CDB's) 403, 405, 407. The channel data block is the fundamental envelope for all informatiion that is sent through the "ether", and is a fixed number of bits (112 bits) that is the final result of the encoding process described below.

Ignoring the exact order or occurrence of the bits, a channel data block can be logically segmented into three component fields as shown in FIG. 5. These fields are: a 48-bit Basic Information Unit (BIU) field 530, a 56-bit Parity field 505, and an 8-bit channel state field 507.

The basic information unit (BIU) field 503 carries the actual control and user information. There are two formats the basic informatiion unit field 503 can assume which are developed in detail later.

The parity field 505 contains 56 bits that are the result of the operation of a rate $\frac{1}{2}$, K=7 convolutional encoding algorithm on the Basic Information Unit. A systematic convolutional code is used (Gl(D)=1) with parity generator:

$$G2(D) = 1 + D^2 + D^5 + D^6$$

The parity bits are inverted prior to transmission. The implementation of this code is discussed in "An Introduction to Error Correcting Codes", by Shu Lin (Prentice Hall, 1970).

In this code, the last 2 parity bits and last 8 data bits will always be zero. Eight of these bits are used to convey the channel state information by changing their sense prior to transmission. These bits logically belong to the channel state field 507. The channel state field 507 contains eight bits, seven of which are used to indicate the state of the inbound channel (inbound with respect to CCM's) to terminals that have potential inbound traffic, so that these terminals will inhibit transmission until the inbound channel is free, thus preventing message collisions. There are two states: busy and idle or free. A binary one indicates a busy state, and a binary zero indicates a free state. In other words, if the channel is busy, all bits of the channel state field 507 are set to a binary one state, and vice versa. In the case of portable and mobile radios, the channel state field 507 may be used to indicate predetermined status of the radio, such as, for example an idle or in-use condition or an emergency or normal condition.

Figure 6:
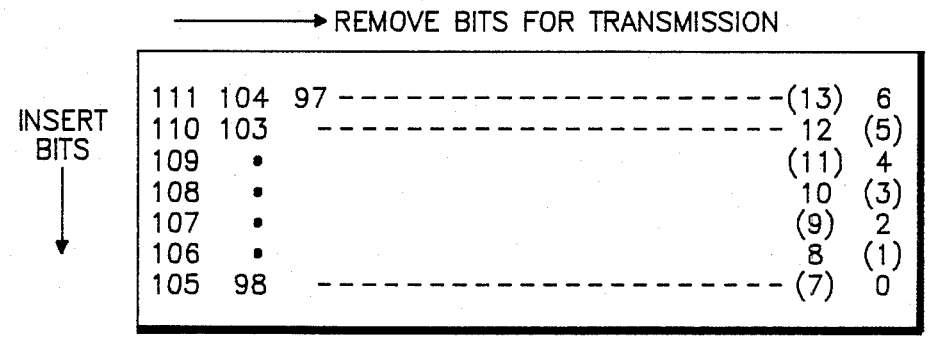
FIG. 6 is a diagram of the bit interleaving matrix used in coding a channel data block.

The next step in the encoding process is the interleaving. Refering to FIG. 6, as the channel data block is encoded, the bits are stored in columns of a matrix. Each column holds 7 bits. The entire 112 bit channel data block fills up exactly 7 rows and 16 columns. The matrix is filled such that every other bit is from parity field 505, i.e. bits 0, 2, 4, 6, 8, 10, etc. are from parity field 505. When the matrix is filled, the bits are removed for transmission row by row. The sequence of bit numbers transmitted is 111, 104, 97, . . . 7, 0. Matrix bit #111 is sent first. Bit numbers in parentheses designate channel state bit locations in the matrix. The locations are bit numbers 1, 3, 5, 7, 9, 11 and 13.

At the receiver, the bits are stored in rows of a matrix. Each row holds 16 bits and the entire 112 bits fills up exactly 7 rows. When the matrix is filled, the bits are removed (for decoding) column by column. This exactly complements the interleaving process of the encoder.

The channel data block decoder takes in the 112 bits and, if possible, extracts an exact copy of the Basic Information Unit and channel state bits that were transmitted. As the bits are removed from the de-interleaving matrix, channel errors are corrected according to the decoding process for such codes, as will be known to one versed in the art, and as explained in the reference mentioned above.

Figure 7:
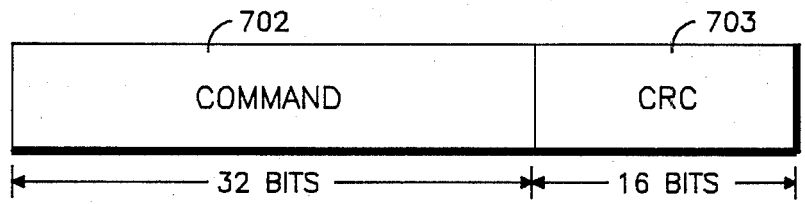
FIG. 7 is a diagram of the structure of a Type-1 basic information unit in FIG. 5.

The Type-1 basic information unit is shown in FIG. 7. This form is used primarily to communicate control information (i.e., terminal address, message control parameters, etc.). The first channel data block of a physical message is always of Type-1.

To properly perform control functions, error detection is required to prevent any uncorrected bit errors from inadvertently causing an undesired control function. This error protection is provided by dividing the 48-bit type 1 basic information unit into two fields: a 32-bit command field 702 and a 16-bit cyclic redundancy check (CRC) field 703. The cyclic redundancy check field 703 is computed from the command field 702 prior to transmission and later checked upon reception.

The error detection code defined here is commonly used in the data communications industry, and is known as CRC-CCITT. The command field 702 to be checked is divided by the generating polynomial:

$$G(x) = X^{16} + X^{12} + X^5 + 1$$

Integer quotient digits are ignored, and the CRC field 703 is filled with the complement of the resulting remainder value. The remainder is complemented (1's complement) to provide protection against bit sync loss.

Upon message reception, the same process is followed. The result is compared with the received CRC and if they exactly match, the message is acceptable.

Figure 8:
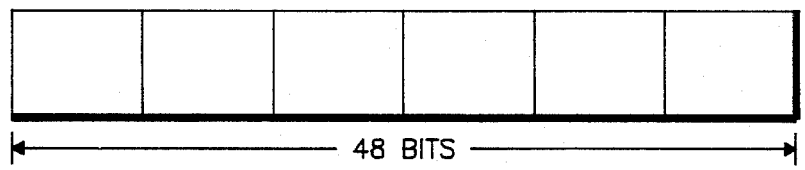
FIG. 8 is a diagram of the structure of a Type-2 basic information unit in FIG. 5.

The type-2 basic information unit in FIG. 8 is used primarily to communicate user data (e.g., text) and error checks on user data.

The format and coding of the type-1 basic information unit in FIG. 5 is described in detail in U.S. patent application Ser. No. 402,682, entitled "Data Signalling System", filed July 28, 1982 and invented by Timothy M. Burke, et. al. and in the instant assignee's copending patent application, U.S. patent application No. 512,800, entitled "Method and Apparatus For Coding Messages Communicated Between A Primary Station And Remote Stations of A Data Communications System", invented by Thomas A. Freeburg and Jay Krebs, and filed the same day as the instant application.

As explained in aforementioned patent application Ser. No. 402,682, the type-1 basic information unit provides for instruction blocks or register blocks. Instruction blocks contain identifier (3 bits) op-code (5 bits), argument (8 bits) fields. The instruction blocks manipulate the contents of registers in the portable and mobile radios (see registers in RAM 626 of microcomputer 520 in FIG. 13). The various instruction blocks and their coding are summarized hereinbelow in Table I.

TABLE I

| R/I | A/N | I/O | OP-CODE | ARG 7 | DESCRIPTION | MNEMONIC |
|---|---|---|---|---|---|---|
| 0 | 0 | x | 0 0010 | | Read Sub-register | RSR |
| 0 | x | x | 0 0011 | | Discrete Operations | DISOP |
| 0 | x | x | 0 0101 | | Vehicle Status | WSR 1,1 |
| 0 | x | x | 0 0110 | | User Status | WSR 1,2 |
| 0 | x | x | 0 0111 | | Message | WSR 1,3 |
| 0 | 0 | 1 | 1 0100 | | Read Register short | RRS |
| 0 | 0 | x | 1 0101 | 0 | Read Register Long | RRL |
| 0 | x | x | 1 0101 | 1 | Write Register Long | WRL |

R/I Bit; 0 = Instruction, 1 = Register.
A/N Bit; 0 = NO ACK, 1 = ACK Required.
I/O Bit; 1 = Outbound from CCM, 0 = Inbound to CCM.
ARG 7; Most Significant Bit of Argument Field.

A variable length physical message can be constructed by transmitting a variable number of channel data blocks continuously. Variable length data (e.g., text, transparent binary information, etc.) is divided (blocked) into an integral number of segments such that each segment fills a chanel data block. The channel data blocks are transmitted, along with appropriate control information, and are de-blocked to recover the original form of the data upon reception.

Figure 16:
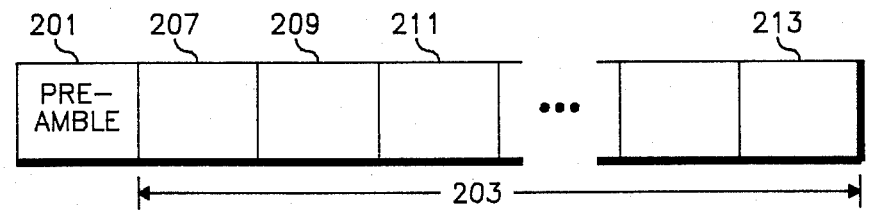
FIG. 16 is a diagram of the structure of variable length messages.

Referring to FIG. 16, variable length physical message 203 is preceeded by preamble 201, and consists of channel data block 207, which is built from a type-1 basic information unit, and contains addressing and command information; channel data block 209, which is also built from a type-1 basic information unit, and contains further control information to be described below; a number of channel data blocks 211, each built from a type-2 basic information unit and containing up to 48 bits of the user data to be transmitted; and terminated by channel data block 213, which is built from a type-2 basic information unit, and contains up to 32 bits of the user data in addition to a 16 bit cyclic redundancy check character.

Since the Type-2 basic information unit format is used for the user data and its definition contains no facility to detect errors that may escape error correction, the message level CRC is defined. This CRC uses the same algorithm that is defined for use in the type-1 basic information unit, and is computed over all of the user data.

Figure 17:
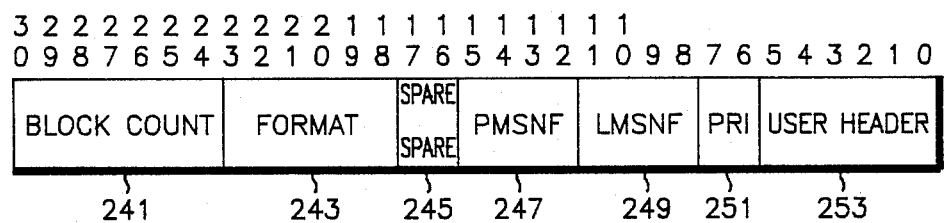
FIG. 17 is a diagram of the structure of the contents of the variable length message control register.

Referring to FIG. 17, a variable length message control register (VLMCR) is loaded with the contents of the second channel data block in the variable length message. The VLMCR then instructs the terminal with format and control information that directs the processing of the message.

The block count field 241 specifies the size of the variable length message. This field provides the terminal with information to perform buffer management and enables the base end controllers to assess the size of inbound variable length messages.

The message format 243 field specifies the format and padding of the user data. The format field is divided into two sub-fields; the information coding sub-field (ICSF) and the information padding sub-field (IPSF). The ICSF specifies one of four possible ways in which the information portion of the message may be coded, e.g. ASCII, binary data, etc. The IPSF specifies the amount of padding that is required to make the message an integer number of blocks.

The physical message sequence number field (PMSNF) 247 is divided into two sub-fields; a 1-bit re-synchronization sequence flag (RSF), and a 3-bit physical message sequence number (PMSN). The physical message sequence number provides the terminal and base ends of the R/F network with the capability to reject duplicate copies of the same message. The duplicate copies can result when ACKs are lost and the message is re-transmitted. The capability to re-sync the PMSN is also defined when RSF=1.

The PMSN is incremented by the sender when an acknowledgement is received to the transmission. A transmission procedure is initiated with the first transmission of a physical message. Subsequent re-transmission of the same physical message, in an attempt to set an acknowledgement, are part of the same transmission procedure and use the same PMSN. That is, repeat transmissions of non-acknowledged physical messages will not cause the number to be incremented. The sequence number, both inbound and outbound, can assume incrementing values modulo-7, including zero (0). Thus, a continuous sequence of physical messages to the same destination will have an incrementing sequence number ( . . . 0, 1, 2, . . . 5, 6, 7, 0, . . . ).

The receiver will only accept messages that have a monotonicly increasing sequence number (modulo-7) that is one greater than the last one it received. The receiver will send a negative acknowledgement, indicating to the sender that the message is out of physical sequence.

The PMSN is re-sync'ed with a physical message that has the RSF set. The re-sync sequence flas (RSF=0) indicates the PMSN is to be checked as described above. When (RSF=1) the PMSN check will not be made and the physical message will be accepted by the receiver (and ACK'ed if specified). Additionally, the receiver's current PMSN will be updated to that of the PMSN of the physical message it rode in on.

The logical message seqeunce number field 249 in FIG. 17 provides the capability to manage the communication of large logical messages by segmenting the logical message into several physical messages. It also supports the capability to interrupt the transmission of a long logical message, composed of many physical message segments, with the transmission of a single segment logical message. This interruption must occur between physical segment transmission.

The LMSNF is further divided into two sub-fields; logical message sequence number (LMSN), and last segement flag (LSF). The LSF indicates that the associated message segment is the last segment in the logical message (LSF=1) or it is not the last segment (LSF=0). The LMSN sequentially numbers and identifies physical message segments within a logical message. In a multi-segment message, the LMSN is initalized to zero (0) upon the transmission of the first physical message segment. The LSMN is incremented with each succeeding message segment and wraps around to the value of one (1) (e.g., 0, 1, 2 . . . 7, 1, 2 . . . ).

Note that zero (0) has been left out of all but the start of the sequence. This permits a single transmission logical message (OIC) to interrupt and resume multi-transmission (multiple physical messages from one logical message) logical message. If the LMSN is found to be out of sequence upon reception, the logical message may be aborted and restarted from the beginning.

If the logical message consists of several physical message segments, the first physical message in the chain will be identified by: LSF=0 and LMSN=0. The physical messages that are in the middle (i.e., not the first nor the last physical messages) are identified by: LSF=0 and (1< =LMSN< =7). Note that the LMSN is allowed to wrap from 7 back to 1. This message may be interrupted by a physical message marked by (OIC) and resumed with the next sequential physical message of the logical message chain. If the logical message consists of several physical message segments, the last physical message will be identified by: LSF=1 and (1< =LMSN< =7).

The user header offset field 253 in FIG. 17 defines the size of the user header information that may precede the displayable portion of the character oriented message. Essentially, the variable length portion of the message is divided into two parts; user header and user data. The user header contains variable length user supplied information (i.e. transaction I.D., program function key, data presentation parameters etc.) that is not displayed, but is passed to user applications programs as a set of parameters. The user data portion is the part of the message that is displayable.

Since the user header is variable length, and in fact optional, it can change in structure and content depending on the message. Also, changes to the user header will not impact the system software of the terminal or base since its contents are transparent to that software.

The message priority field 251 provides the terminal with the capability to process messages at four (4) different priority levels.

Referring back to FIG. 1, message signals are routed by GCC 104 to a selected CCM 106, 108, 110 and 112 for transmission by its corresponding transmitter. Since the message signals are not transmitted on all transmitters simultaneously, as in simulcast systems of the type described in U.S. Pat. No. 4,188,522, it is necessary that GCC 104 have a reasonably accurate determination of the location of each portable radio 130, 132 and 134 so that GCC 104 may select the transmitter 114, 120 or 124 which covers the zone in which a particular portable radio is located. Utilizing unique processes, the GCC 104 dynamically selects the transmitter 114, 120 or 124 for transmitting a message signal to a selected portable or module radio 130, 132, 134, 136 or 138.

According to another unique feature of the novel data communications system in FIG. 1, two or more of the transmitters 114, 120 or 124 can be operated simultaneously for communicating with different portable radios located in different zones provided that transmissions from the two transmitters do not interfere with reception in the particular zones where the two portable radios are located. As a result, data throughput of the data communications system illustrated in FIG. 1 can be significantly increased by re-use of the RF communication channel. In other words, by taking advantage of re-use, a single RF communications channel can serve thousands of portable and mobile radios in a geographical area covering several states and their major cities.

Figure 9:
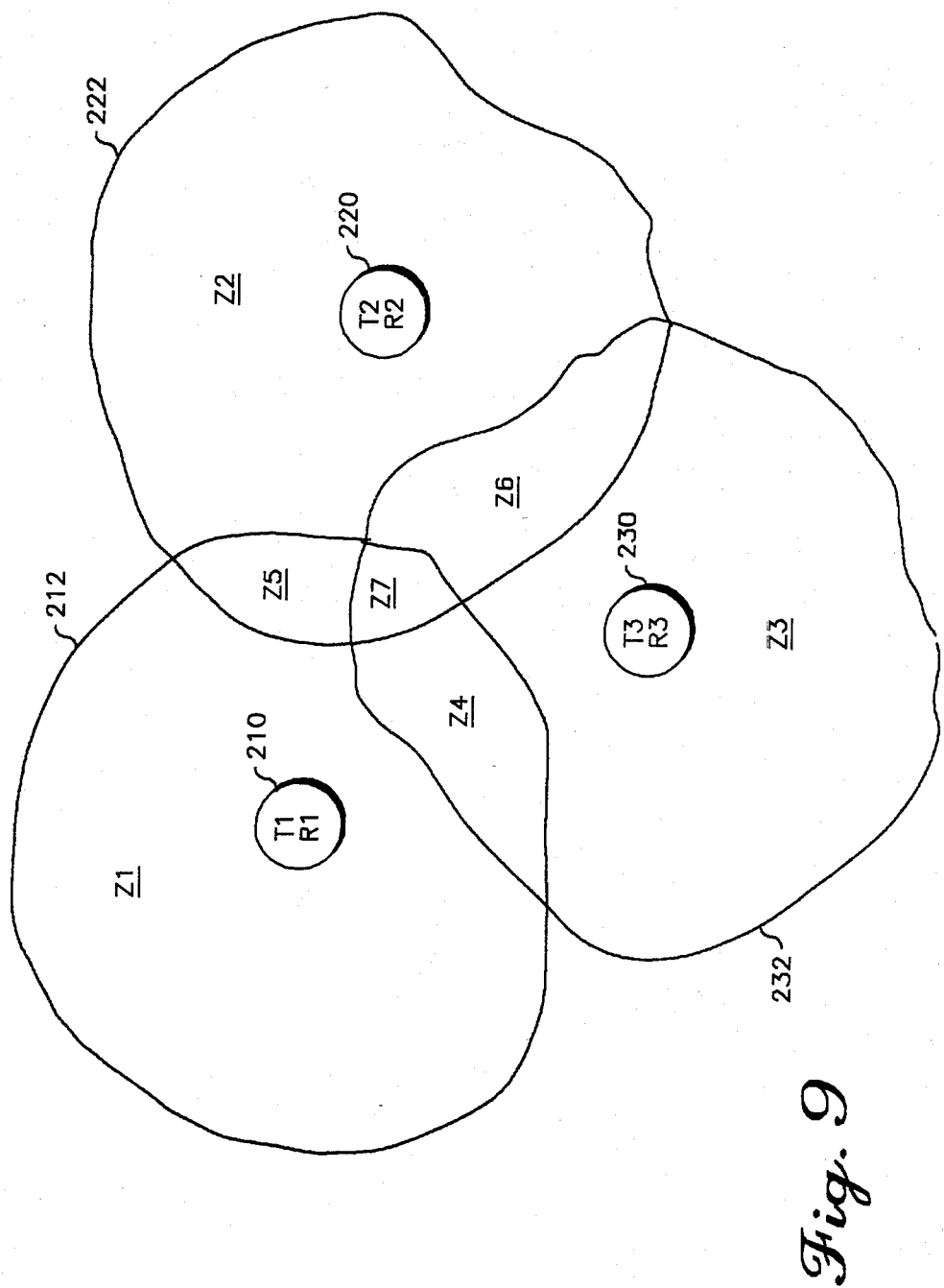
FIG. 9 is a diagram of a geographical area that is divided up into a number of zones.

Referring to FIG. 9, there is illustrated a geographical area of a data communications system that is divided into seven zones, Z1–Z7, and that includes three CCMs 210, 220 and 230 and corresponding transmitters and receivers. Transmitters T1 of CCM 210 has a coverage area within circle 212, transmitter T2 of CCM 220 within circle 222, and transmitter T3 of CCM 230 within circle 232. Each time a portable or mobile radio transmits, signal strength readings are taken by receivers R1, R2 and R3. These readings can be expressed by the following signal strength SSI matrix:

$$[SSI] = [SSI_1\ SSI_2\ SSI_3].$$

The signal strength readings taken by receivers R1, R2 and R3 can be used to compute an adjusted signal strength for each zone Z1–Z7 by adjusting the measured signal strength for each receiver R1, R2, and R3 by corresponding predetermined factors associated with the particular zone and then combining the adjusted signal strengths. The predetermined factors used to compute the adjusted signal strength depend on a number of factors such as the terrain, the height and gain of the antennas, and the sensitivity of the receivers. In other words, the predetermined factors associated with each zone are emperically determined and depend upon the characteristics of the equipment and terrain in each data communications system. The predetermined factors can be arranged in a zone selection ZSEL matrix, such as, or example, the exemplary ZSEL matrix hereinbelow:

$$[ZSEL] = \begin{bmatrix} 15.5 & 0 & 0 & 10.7 & 10.4 & 0 & 7.7 \\ 0 & 15.3 & 0 & 0 & 9.8 & 10.2 & 7.5 \\ 0 & 0 & 15.7 & 10 & 0 & 11 & 7.4 \end{bmatrix}$$

The adjusted signal strength ZADJ matrix for each of the zones Z1–Z7 is than computed according to the following matrix formula:

$$[ZADJ] = [SSI] \times [ZSEL];\ \text{or}$$

$$[ZADJ] = [Z_1ADJ\ Z_2ADJ\ Z_3ADJ\ Z_4ADJ\ Z_5ADJ\ Z_6ADJ\ Z_7ADJ]$$

Then, using the ZADJ matrix, GCC 104 can select the zone which has the largest adjusted signal strength for a particular transmission from a portable or mobile radio. The selected zone can be stored together with other data in a location of the memory of GCC 104 associated with that portable radio.

Whenever transmitting a message signal to that particular portable or mobile radio, GCC 104 will first transmit the message signal on the carrier signal of the transmitter that covers the zone which had the largest adjusted signal strength for the last transmission from that portable or mobile radio. Both that zone and the transmitter covering it are stored in the memory of GCC 104. If the portable or mobile radio does not acknowledge the transmission of the message signal from GCC 104, GCC 104 may attempt one or more retransmissions of the message signal by means of that selected transmitter. If the retransmissions likewise are not acknowledged by the portable or mobile radio, GCC 104 may then transmit the message signal via the transmitter covering the zone which had the second largest adjusted signal strength for the last transmission from that portable or mobile radio. Again, if the portable radio does not acknowledge the transmission from GCC 104, GCC 104 may resend the message signal one or more times by means of that selected transmitter. If GCC 104 does not reach the selected portable or mobile radio by means of these two transmitters, GCC 104 may either select another transmitter covering that portable or mobile radios "home" zone, or initiate a polling sequence in which the selected portable or mobile radio is polled in every zone in the data communications system starting with the portable or mobile radio's "home" zone.

The transmitter re-use features of the novel data communications system in FIG. 1 are described in further detail in the instant assignee's co-pending U.S. patent application, Ser. No. 441,327, (now U.S. Pat. No. 4,481,670,) entitled "Method and Apparatus for Dynamically Selecting Transmitters For Communications Between A Primary Station and Remote Stations of a Data Communications System", filed Nov. 12, 1982, and invented by Thomas A. Freeburg.

Figure 10:
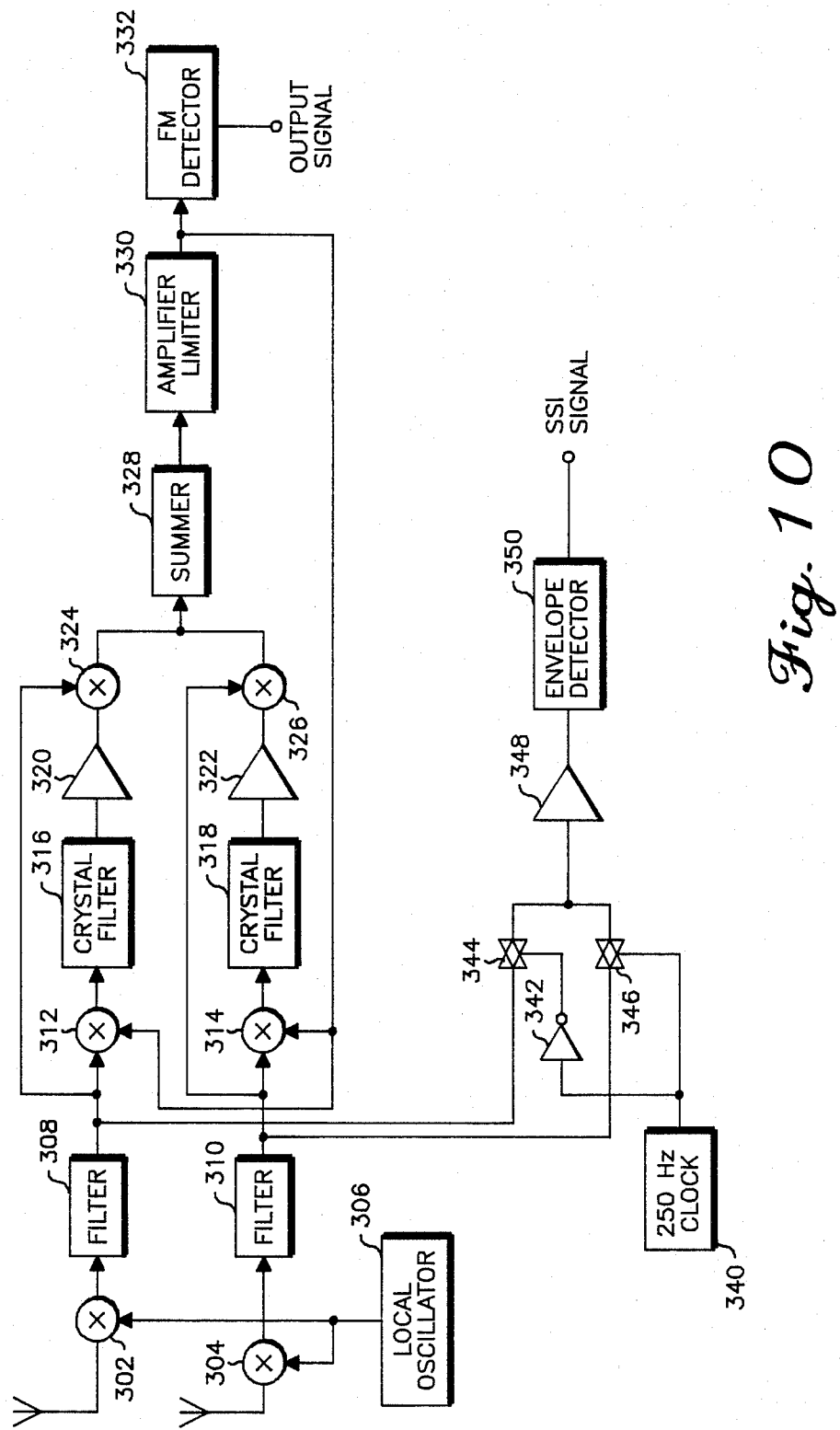
FIG. 10 is a block diagram of the circuitry in the receivers in FIG. 1.

Referring to FIG. 10, there is illustrated a detailed circuit diagram of the receivers 116, 118, 122, 126 and 128 associated with CCM's 106, 108, 110 and 112 in FIG. 1. Each receiver includes two antennas spaced at a predetermined distance from one another and a maximal ratio predetection diversity combiner 312, 314, 316, 318, 320, 322, 324, 326 and 328 for combining the signals received by each of the antennas. The space diversity provided by the two antennas is utilized to prevent degradation in communications which results when an antenna is located in an RF signal null. Rapid and deep RF signal nulls, called Rayleigh fading, are experienced in communications systems operating at RF signal frequencies in the new 800 to 900 mHz frequency range. The maximal ratio predetection diversity combiner cophases the RF signals from each antenna and linearly adds the cophased signals to provide a composite signal having components that are proportional to the square of the RF signals from each antenna. Therefore, strong signals are emphasized much more than weak signals. In other words, communications are not adversely affected if a very weak signal is received by one antenna and a reasonably good signal is received by the other antenna.

In the diversity receiver in FIG. 10, the frequency of local oscillator 306 determines the radio channel to which the delivery receiver is tuned. The RF signal received by each antenna is combined by mixers 302 and 304 with the signal from local oscillator 208 to provide corresponding IF signals. The IF signal from mixers 302 and 304 is then applied to IF bandpass filters 308 and 310, respectively, which may be a monolithic bandpass filter of conventional design similar to that described in U.S. Pat. No. 3,716,808. The filtered IF signals from filters 308 and 310 are split and fed forward via two paths to mixers 312, 324 and 314, 326, respectively. First portions of the IF signals are applied to mixers 324 and 326, and second portions of the IF signals are applied to mixers 312 and 314 together with the composite IF signal which is fed back from amplifier 330. By feeding back the composite IF signal, the IF strip of the diversity receiver forms a closed feedback loop that is regenerative on noise. Thus, the randomly varying phase of the IF signals from filters 308 and 310 relative to the composite IF signal is added into the closed loop via mixers 312 and 314 and then substracted out at mixers 324 and 326, respectively. By this process, the random phase variations are removed from the If signals in relation to the composite IF signal. The result is that each of the IF signals is cophased to the composite IF signal.

The product signals from mixers 312 and 314 at the difference frequency are applied to filters 316 and 318, respectively, which each provide a variable phase shift. Filters 316 and 318 may be two-pole crystal filters. The signals from filters 316 and 318 are linearly amplified by amplifiers 320 and 322, respectively and applied to the second input of mixers 324 and 326, respectively. Mixers 324 and 326 multiply the signals from amplifiers 320 and 322, respectively, with the IF signals from filters 308 and 310, respectively, to provide product signals that are cophased with the composite IF signal. The product signals from mixers 324 and 326 are both cophased and proportional to the square of the level of the IF signal from filters 308 and 310, respectively. The product signals from the mixers 324 and 326 are linearly added by summer 328 to form one composite IF signal. The composite IF signal may be coupled via amplifier 330 to a conventional FM detector 332 which has an output signal providing demodulated message signals. The output signal of FM detector 332 is coupled to its corresponding CCM 106, 108, 110 or 112 in FIG. 1. Further details of the circuitry in the diversity receiver in FIG. 3 are illustrated and described in the instant assignee's co-pending U.S. patent applications, Ser. No. 22,757, (now U.S. Pat. No. 4,369,520,) on Mar. 22, 1979, entitled "Instantaneously Acquiring Sector Antenna System", and invented by Frank J. Cerny, Jr. and James J. Mikulski, and in Ser. No. 268,613 filed on June 1, 1982, entitled "Large Dynamic Range Multiplier for a Maximal Ratio Diversity Combiner", and invented by Frank J. Cerny, Jr.

FIG. 10 illustrates the circuitry 340, 348 and 350 comprising the signal strength detector that is located in the receivers. Summer 340 is coupled to the signals from filters 308 and 310 and provides a composite signal which is coupled to amplifier 348. The output of amplifier 348 is coupled to envelope detector 350 which provides an SSI signal that is proportional to the maxima of the composite signal from amplifier 348. A separate amplifier 348 and envelope detector 350 can be provided for each of the signals from filters 308 and 310 if it is desired to measure each separately. The SSI signal from envelope detector 350 is coupled to its corresponding CCM 106, 108, 110 or 112 in FIG. 1, where it is digitized. Many other types of commercially available signal strength detecting circuitry can be utilized in place of summer 340, amplifier 348, and envelope detector 350.

Figure 11:
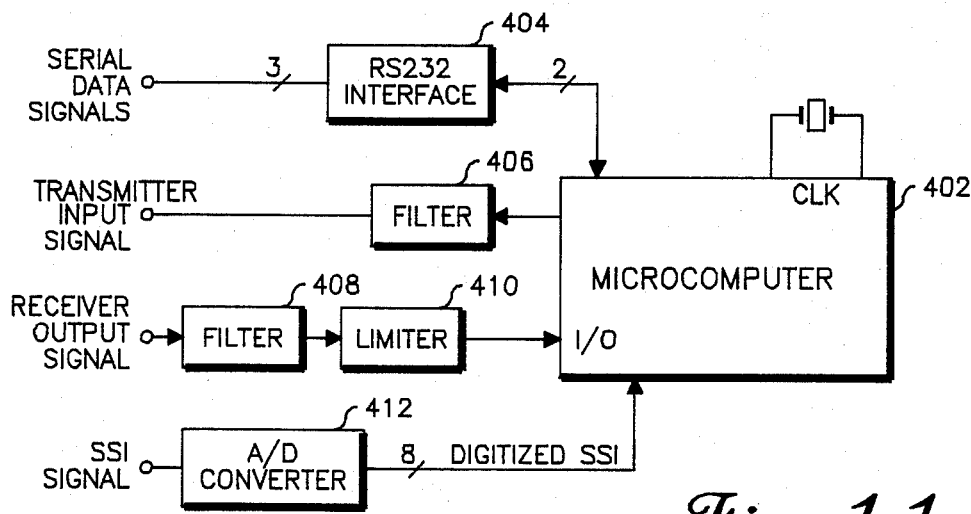
FIG. 11 is a block diagram of the circuitry in the channel communications modules in FIG. 1.

Referring to FIG. 11, there is illustrated a block diagram of the circuitry in CCM's 106, 108, 110 and 112 in FIG. 1. Each CCM includes a microcomputer 402 having a memory with stored program therein for communicating with GCC 104 and portable and mobile radios 130, 132, 134, 136 and 138 in FIG. 1. Microcomputer 402 can be any suitable commercially available microcomputer such as, for example, the Motorola type MC6800, MC6801, MC6805 or MC68000 microprocessor, or those microprocessors described in U.S. Pat. Nos. 4,030,079 and 4,266,270, and the patents and patent applications referred to therein.

Microcomputer 402 is coupled to conventional RS232 interface 404 which may be coupled by a modem to a dedicated telephone line from GCC 104 in FIG. 1. Message signals received by microcomputer 402 from the GCC may be assembled into variable length messages 203, 204 in FIG. 2 and coupled to filter 406 and thereafter applied to its corresponding transmitter. The preferred embodiment of the transmitter utilizes digital frequency modulation at 4800 bits per second for coding message signals for transmission. A suitable modulation circuit is described in U.S. Pat. No. 3,414,842. Other suitable message signal coding schemes are described in the aforementioned U.S. Pat. Nos. 3,906,445, 4,156,867 and 4,354,252 and patent application Ser. No. 402,682. Message signals received from portable or mobile radios by a CCM's receiver are coupled to filter 408 and thereafter to limiter 410 which converts the analog signals into a non-return-to-zero binary signal. The output of limiter 410 is applied to an input port of microcomputer 402 which decodes the information and data therein.

Microcomputer 402 also takes signal strength readings while it is receiving message signals. The SSI signal from its corresponding receiver is coupled to A/D converter 412, which may continuously convert the analog SSI signal to a digitized SSI signal having eight bits. The digitized SSI signal from A/D converter 412 is applied to an input port of microcomputer 402. Several A/D conversions are performed while a message signal is being received. The digitized SSI signals for the several conversions are averaged by microcomputer 402. The average SSI signal is appended to the received message signal which is sent by microcomputer 404 via RS232 interface 404 to GCC 104 in FIG. 1. The information and data in a received message signal may be coded in any suitable convention format for transmission to GCC 104.

Figure 12:
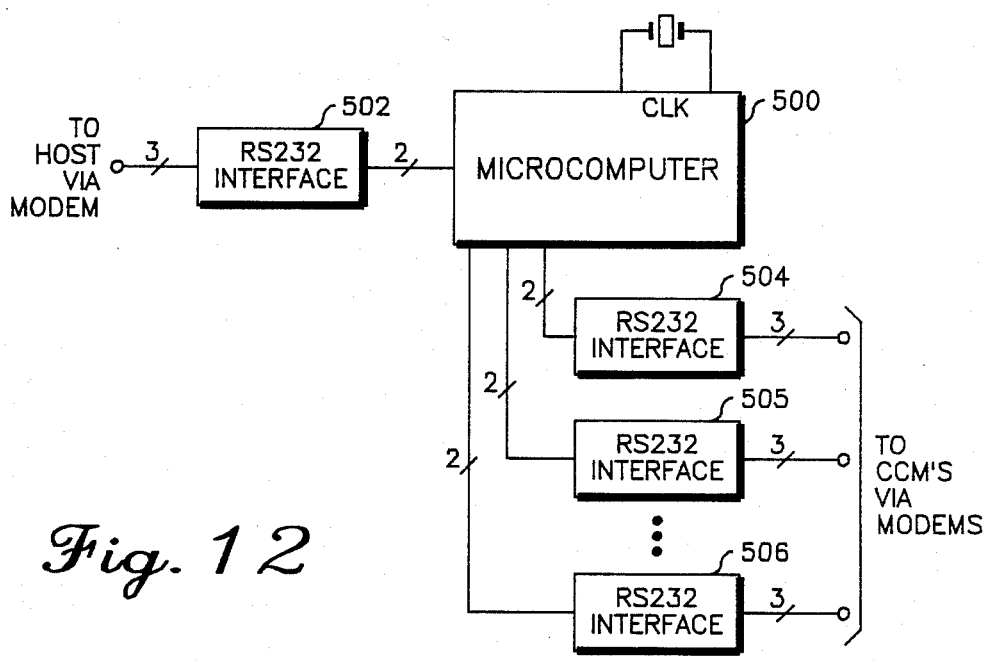
FIG. 12 is a block diagram of the circuitry in the general communications controller in FIG. 1.

Referring to FIG. 12, there is illustrated a block diagram of the circuitry in the general communications controller 104 in FIG. 1. The GCC includes a microcomputer 500 having a memory with a stored program for communicating with CCM's 106, 108, 110 and 112 in FIG. 1. Microcomputer 500 is coupled to conventional RS232 interfaces 504, 505 and 506 which may be coupled by modems to dedicated telephone lines from each CCM. Microcomputer 500 is also coupled to a conventional RS232 interface 502 which may be coupled to a dedicated telephone line from host computer 102 in FIG. 1. Information in message signals received from portable radios by way of CCM's 106, 108, 110 and 112 is forwarded by microcomputer 500 to host computer 102. Conversely, information to be sent to portable radios from host computer 102 is transmitted to microcomputer 500 and incorporated into message signals transmitted to designated portable radios. Microcomputer 500 receives signal strength information from each of the CCM's whenever a portable radio transmits a message signal and processes the signal strength information to determine the zone in which that portable radio is presently located.

Microcomputer 500 stores for each portable radio the zone having the largest adjusted signal strength for the last transmission, the zone having the second largest adjusted signal strength for the last transmission, the "home" zone assigned to that portable radio, and the last zone used for communications with that portable radio. For subsequent transmissions of message signals to a portable radio, the GCC accesses the zone location information for that portable radio and selects a transmitter for transmitting a message signal in the zone in which the portable radio is most likely located. Microcomputer 500 also keeps track of which transmitters are in use and which transmitters interfere with communications in a particular zone. Thus, when transmitting a message signal in the zone where a selected portable radio is located, microcomputer 500 inhibits the use of other transmitters which would interfere with communications in that zone. If transmission of a message signal to a portable radio would interfere with a transmission already under way, microcomputer 500 queues that message signal for transmission when the interfering transmitter has completed its transmission. Microcomputer 500 can be any suitable commercially available microcomputer, such as, for example, a Motorola type MC6800, MC6801, MC6805 or MC68000 microprocessor, or those microprocessors described in U.S. Pat. Nos. 4,030,079 and 4,266,270 and the patents and patent applications referred to therein.

Figure 13:
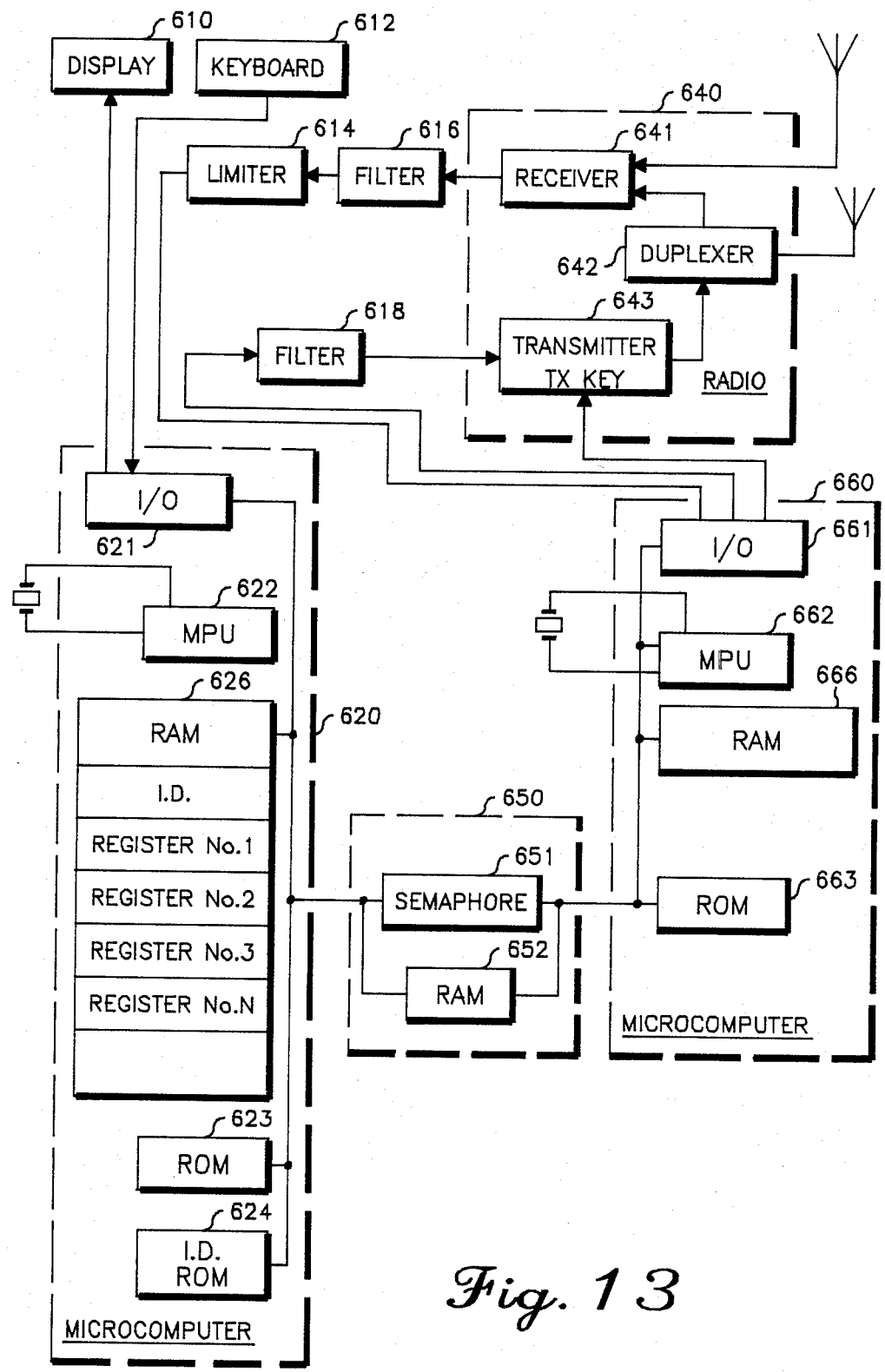
FIG. 13 is a block diagram of the circuitry in the portable radios in FIG. 1.

Referring to FIG. 13, there is illustrated a block diagram of the circuitry in portable and mobile radios 130, 132, 134, 136 and 138 in FIG. 1. Each portable or mobile radio includes a radio transceiver 640, microcomputers 620 and 660, an alphanumeric display 610, and a keyboard 612. Alphanumeric display 610 may be any commercially available display, such as an LCD display or gas discharge display, that provides for the display of one or more lines of alphanumeric information. Display 610 is controlled by I/O device 621 of microcomputer 620. Keyboard 612 may be any commercially available keyboard having both numeric and alphanumeric keys. Keyboard 612 is coupled to I/O device 612 of microcomputer 620, which senses activation of its various keys.

Radio transceiver 640 in FIG. 13 may be any suitable commercially available transceiver, such as that described in the aforementioned Motorola instruction manual No. 68P81039E25 and in Motorola instruction manual No. 68P81014C65. Radio transceiver 640 includes two antennas spaced at a predetermined distance from one another for providing receiver diversity. The two antennas may also be located within the radio housing as shown and described in the instant assignee's copending patent applications, U.S. patent application Ser. No. 511,430, entitled "Homotropic Antenna System", invented by Thomas F. Kneisel et al, filed on July 6, 1983, and U.S. patent application Ser. No. 511,431, entitled "Signal Quality Steered Diversity" invented by Eugene J. Bruckert et al, and filed on July 6, 1983. Receiver 641 is coupled directly to one antenna and coupled by duplexer 642 to the other antenna. Duplexer 642 may be any suitable commercially available duplexer, such as that described in U.S. Pat. No. 3,728,731. Receiver 641 may include suitable commercially available circuits for selecting between the two antennas, such as, for example, the antenna selection circuitry in the aforementioned patent applications, Ser. Nos. 511,430 and 511,431 and in Motorola instruction manual No. 68P81039E25. Receiver 641 demodulates message signals transmitted from the CCM transmitters. The demodulated message signals are filtered by filter 616 and limited by limiter 614 and thereafter applied to I/O device 661 of microcomputer 660. Message signals from I/O device 661 of microcomputer 660 are applied to filter 618 and thereafter to transmitter 643 for transmission to CCM receivers. Transmitter 643 is turned on in response to the TX key signal from I/O device 661 of microcomputer 660. The output of transmitter 643 is coupled to one of the radio transceiver antennas by way of duplexer 642.

Microcomputers 620 and 660 in FIG. 13 each include I/O devices 621 and 661, microprocessor (MPU) 622 and 662, random-access memory (RAM) 626 and 666, and read-only memory (ROM) 623 and 663, respectively. Microcomputer 620 also includes a removable I.D. ROM 624, which contains the sixteen bit address assigned to the portable or mobile radio. MPU's 622 and 662 may be any suitable commercially available microprocessor, such as, for example, the Motorola Type MC6800, MC6801, MC6805 or MC68000 microprocessors, or those microprocessors described in U.S. Pat. Nos. 4,030,079 and 4,266,270 and the patent application referred to therein. Similarly, I/O device 621 and 661, RAM 626 and 666, ROM 623 and 669 and I.D. ROM 624 may be any commercially available devices that are suitable for operation with the type of microprocessor selected for MPU's 622 and 662. ROM's 623 and 663 store the control programs that are executed by MPU's 622 and 662, respectively for communicating message signals and acknowledgement signals between the portable or mobile radio and GCC 104 in FIG. 1. RAM 626 includes both a scratch pad area used by MPU 622 during execution of the control program stored in ROM 623 and a number of register locations allocated for storing the address or identification code of the portable or mobile radio read in by MPU 622 from I.D. ROM 624, information displayed by display 610, information entered from keyboard 612, and other status and control information. The contents of specific registers in RAM 626 may be loaded or read-out by way of message signals received from GCC 104 in FIG. 1.

Microcomputer 660 in FIG. 13 receives messages 203, 204 in FIG. 2 by way of receiver 641 from the GCC. Microcomputer 660 demodulates, de-interleaves and decodes the information and data in each message and loads the data into shared memory 650, which includes semaphore 651 and RAM 652. Access of RAM 652 is controlled by semaphore 651, which is shown and described in further detail in the instant assignee's copending patent application, Ser. No. 480,777, entitled "Semaphore For Memory Shared by Two Asynchronous Microcomputers", invented by John P. Byrns, and filed on Apr. 22, 1983. Microcomputer 620 then accesses the new information and data from shared memory 650 and processes it. Information and data to be transmitted is formatted into information and data words (see FIGS. 2, 5 and 7) and loaded into shared memory by microcomputer 620. Microcomputer 660 reads out the information and data words from shared memory 650 and assembles the information and data words into messages 203, 204 as illustrated in FIG. 2 and automatically transmits the messages to the GCC.

The portable radio illustrated in FIG. 13 may be either a mobile radio that is installed in a vehicle or a portable radio that is small enough to be hand-carried from place to place (See the aforementioned Motorola instruction manual No. 68P81014C65). Although the portable or mobile radio in FIG. 13 is primarily adapted to transmit and receive message signals including alphanumeric information, the radio may also provide voice communications by means of a speaker (not shown) connected to the output of receiver 641 and a microphone (not shown) connected to the input of transmitter 643. A portable radio adapted to communicate both alphanumeric information and voice signals is described in the instant assignee's co-pending application U.S. patent application Ser. No. 323,644 (now U.S. Pat. No. 4,430,742), filed Nov. 20, 1981, entitled, "Data Muting Method and Apparatus for Radio Communications System", and invented by Thomas A. Freeburg et. al.

Figure 14A:
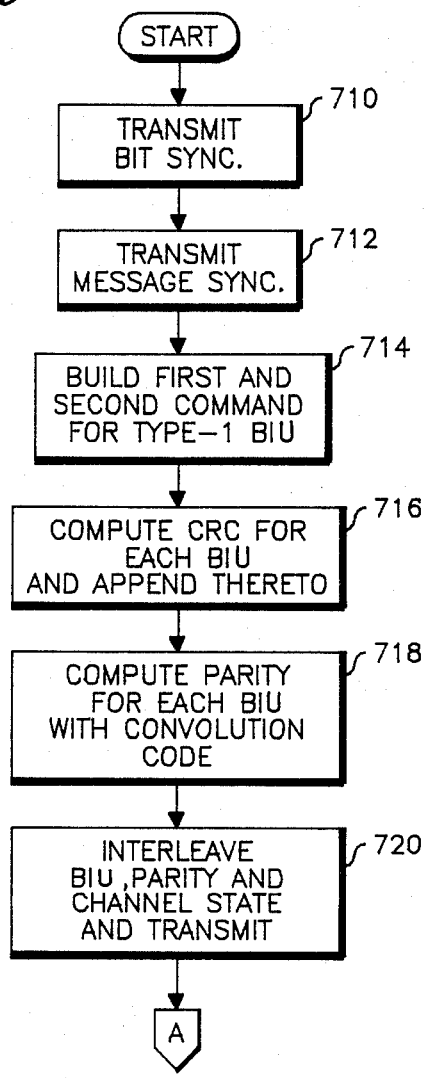
FIGS. 14A and 14B taken together are a flow chart used by the channel communications modules and portable and mobile radios in FIG. 1 for building, coding and transmitting messages to another station.
Figure 14B:
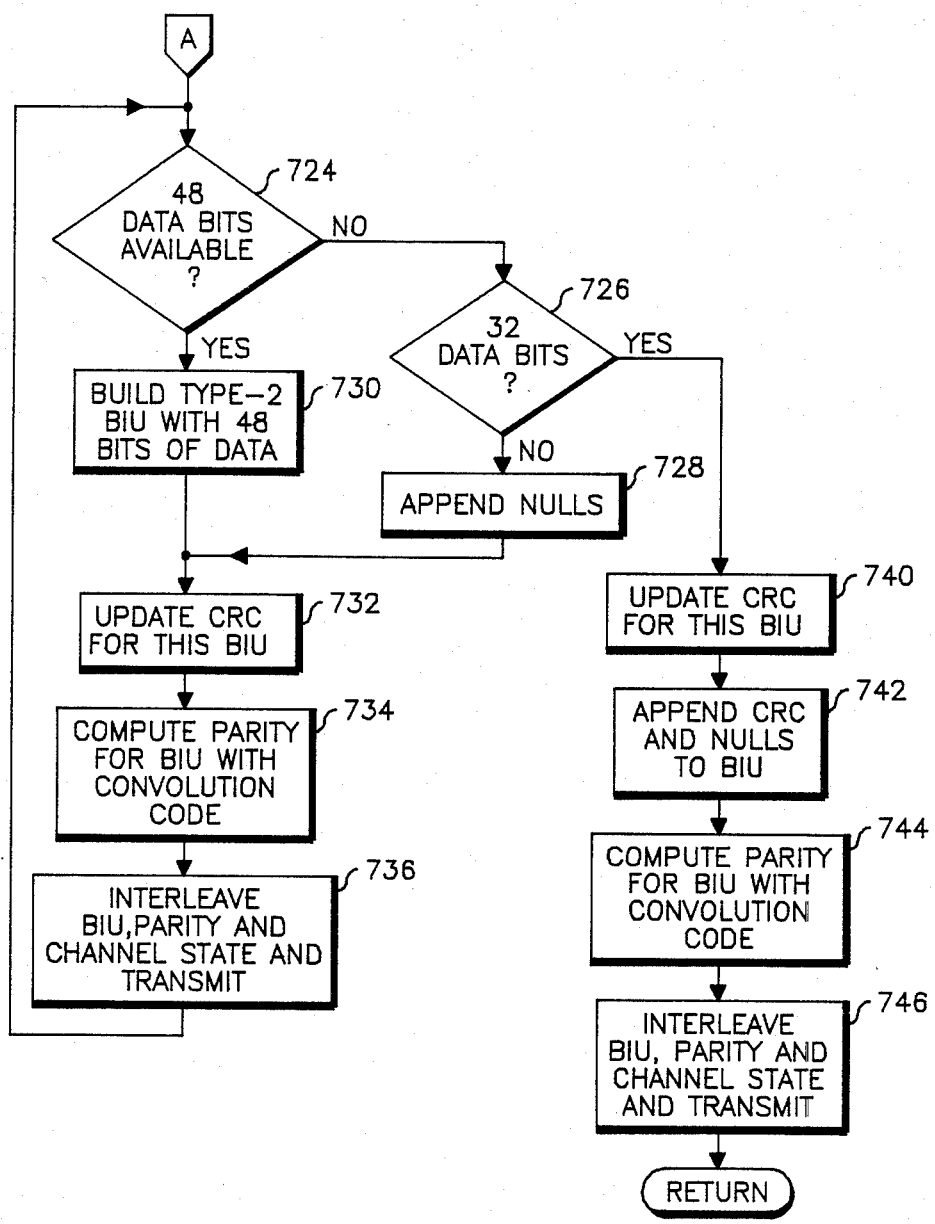

Referring next to FIGS. 14A and 14B taken together, there is illustrated a flow chart including the process steps used by CCM's 106, 108, 110 and 112 and portable and mobile radios 130, 132, 134, 136 and 138 in FIG. 1 for building, coding and transmitting messages to another station. The flow chart in FIGS. 14A and 14B provides a detailed description of the process steps for enabling microcomputer 402 in FIG. 11 and microcomputer 660 in FIG. 13 to transmit variable length messages. The coding of the process steps of the flow chart in FIGS. 14A and 14B into the instructions of a suitable commercially available microcomputer is a mere mechanical step for a routineer skilled in the art.

Referring to FIG. 14A, the flow chart for transmitting variable length messages is entered at block 710 where the bit synchronization pattern is transmitted first. Next, a block 712, the message synchronization pattern is transmitted. Proceeding to block 714, the commands for the type-1 BIU in the first and second channel data blocks is built. Then, at block 716, the CRC is computed for each BIU and appended thereto. The parity for each BIU is computed in block 718 using a preselected convolution code. Then, at block 720, the BIU, parity and channel state are interleaved, as illustrated and described with respect to FIG. 6 hereinabove, and the first and second channel data blocks are transmitted from the originating station. At any point during the transmission of a channel data block, the binary state of the bits in the channel state field are dynamically changed to reflect predetermined status, such as, for example, whether or not the inbound channel is busy or free, or whether or not an emergency condition exists at the originating station. Since the binary state of the bits in the channel state field are dynamically changed, the predetermined status conveyed by the channel state field can be detected by the destination station without first decoding the information in a channel data block.

Referring next to FIG. 14B, program control proceeds from block 720 in FIG. 14A to block 724 where a check is made to see if 48 bits of data are available. If so, YES branch is taken from decision block 724 to block 730 where a type-2 BIU is built with the next 48 bits of data. Then, at block 732, the CRC is updated to reflect the present BIU. The parity is then computed for the present BIU at block 734 with the preselected convolution code. Then, at block 736, the present BIU, parity and the channel state are interleaved and the channel data block is transmitted by the originating station. Program control then proceeds back to decision block 724 to check for any remaining data bits to be transmitted.

If 48 bits of data are not available, NO branch is taken from decision block 724 to decision block 726 where a check is made to determine if there are 32 or less data bits remaining. If not, NO branch is taken from decision block 726 to block 728 where null data is appended to the more than 32 data bits to create a 48 bit field. Program control proceeds from block 728 to block 732 for transmitting the newly formed 48 bits of data.

If 32 or less data bits are available, YES branch is taken from decision block 726 to block 740 where the CRC is updated to reflect the present BIU. Then, at block 742, the CRC and any necessary null data is appended to the 32 or less data bits to form a 48 bit BIU. The parity is then computed for the present BIU at block 744 with the preselected convolution code. Finally, at 746, the BIU, parity and channel state are interleaved and the last channel data block is transmitted by the originating station.

Figure 15A:
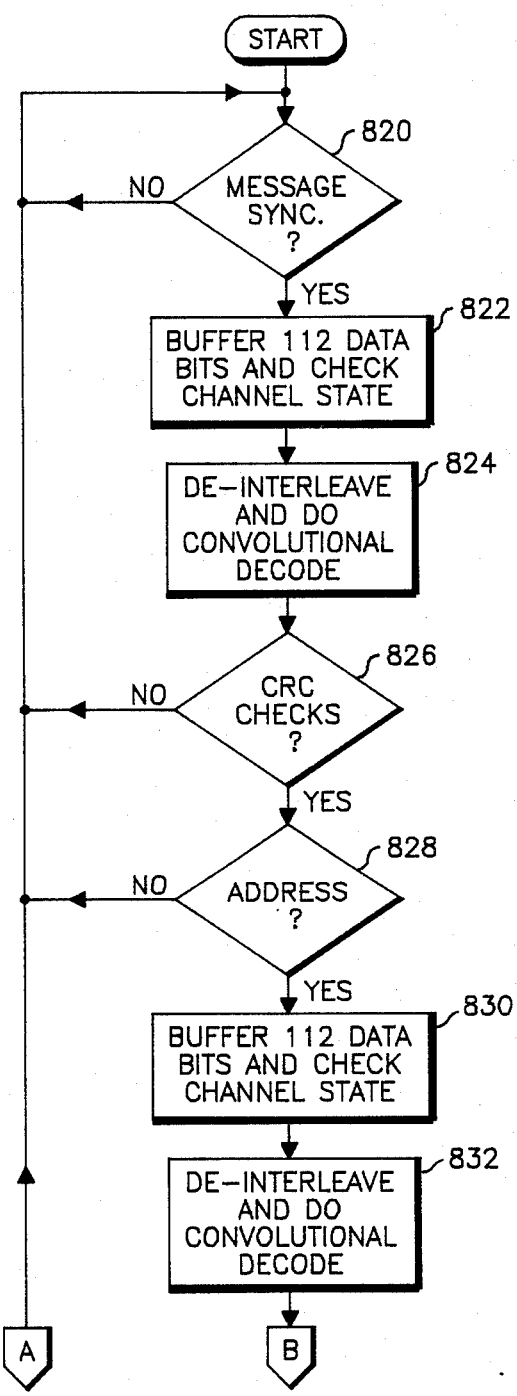
FIGS. 15A and 15B taken together are a flow chart used by the channel communications modules and portable and mobile stations in FIG. 1 for receiving and decoding messages from another station.
Figure 15B:
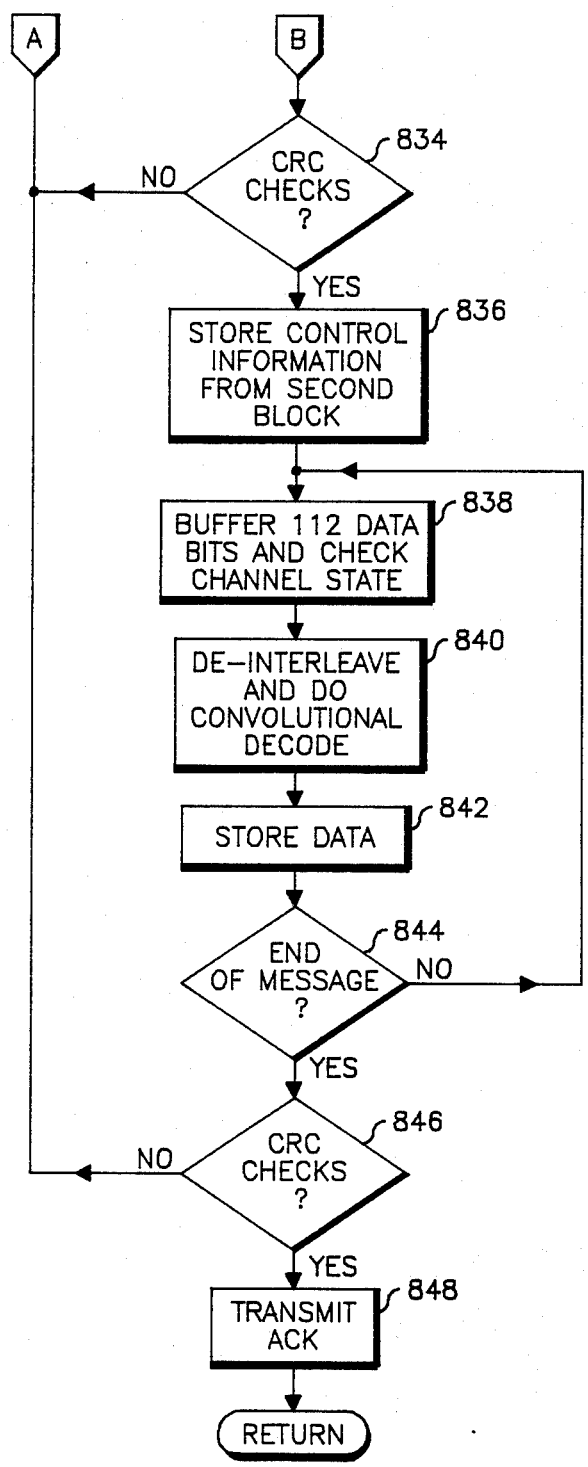

Referring to FIGS. 15A and 15B taken together, there is illustrated a flow chart used by CCM's 106, 108, 110 and 112 and portable and mobile radios 130, 132, 134, 136 and 138 in FIG. 1 for receiving and decoding messages from another station. The flow chart in FIGS. 15A and 15B provides a detailed description of the process steps for enabling microcomputer 402 in FIG. 11 and microcomputer 550 in FIG. 13 to receive variable length messages. The coding of the process steps of the flow chart in FIGS. 15A and 15B into the instruction of a suitable commerically available microcomputer is a mere mechanical step for a routineer skilled in the art.

Referring to FIG. 15A, the flow chart for receiving and decoding messages is entered at decision block 820, where a check is made to determine if message sync has been received. If not, NO branch is taken and program control waits for reception of message sync. Otherwise, YES branch is taken from decision block 820 to block 822, where the next 112 data bits are buffered and the channel state bits are checked. If three or more consecutive bits of the channel state field indicate that the channel is busy, the transmission of messages by the receiving station are inhibited until three or more consecutive bits of the channel state field indicate that the channel is free. Thus, according to an important feature of applicants' signalling system, collisions between simultaneously transmitting stations can be prevented by utilizing the information in the channel state field.

Next, at block 824, the buffered channel data block is deinterleaved and decoded using the preselected convolution code. Then, at decision block 826, a calculated CRC for the received BIU is compared with the received CRC. If they are not the same, NO branch is taken to return back to decision block 820. Otherwise, YES branch is taken to decision block 828 where the received address is checked. If the received address is not valid, NO branch is taken back to decision block 820. The validity check is made by portable and mobile stations by comparing the received address with their preassigned address stored in ID ROM 624 in FIG. 13. In the case of GCC, the received address is valid if it is assigned to an active mobile or portable radio in the data communication system. If the received address is valid, YES branch is taken from decision block 828 to block 830 where the next 112 data bits are buffered and the channel state field is checked. Then, at block 832, the received CDB is deinterleaved and decoded using the preselected convolution code.

Program control proceeds from block 832 in FIG. 15A to decision block 834 in FIG. 15B, where a calculated CRC for the received BIU is checked with the received CRC. If they are not the same, NO branch is taken to return to decision block 820 in FIG. 15A. Otherwise, YES branch is taken to block 836 where the control information from the second CDB is stored in an appropriate register. In the case of portable and mobile radios, a register in RAM 626 in FIG. 13 is loaded with the control information. Then, at block 838, the next 112 data bits of the next CDB are buffered and the channel state is again checked. The received CDB is deinterleaved and decoded using the preselected convolution code at block 840. Then, at block 842, the data in the received CDB is stored in a buffer in the receiving station. Next, at decision block 844, a check is made to determine if the received CDB is the last CDB of a message. If not, NO branch is taken back to block 838. Otherwise, YES branch is taken to decision block 846 where a calculated CRC for the received BIU is compared to the received CRC. The last CDB of a message contains the CRC for all CDB's carrying data. If they are not the same, NO branch is taken back to decision block 820 in FIG. 15A. Otherwise, YES branch is taken to block 848, where an acknowledgement message (ACK) is transmitted by the receiving station to indicate to the originating station that the message has been properly received. The transmission of the ACK message may have to be delayed depending on the state of the bits in the received channel state field.

The flow charts in FIGS. 14 and 15 provide a detailed description of the process steps used by CCM microcomputers 402 in FIG. 11 and portable and mobile microcomputers 660 in FIG. 13 for communicating message signals between stations. The coding of the process steps of the flow charts in FIGS. 14 and 15 into the instructions of a suitable commercially available microcomputer is a mere mechanical step for a routineer skilled in the art. By way of analogy to an electrical circuit diagram, the flow charts in FIGS. 14 and 15 are equivalent to a detailed schematic for an electrical circuit where provision of the exact part values for the electrical components in the electrical schematic corresponds to provision of microcomputer instructions for blocks in the flow charts.

In summary, a unique method and apparatus for communicating variable length messages between stations of a data communications systems has been described. The novel signalling system results in messages that are more tolerant of burst errors than heretofore possible. Furthermore, the channel state, i.e. busy or free status, is dynamically communicated to all stations for minimizing message collisions.

We claim:

1. A signalling system for communicating messages via a communications medium between a primary station and a plurality of remote stations in a data communications system, said signalling system including a variable length message which is transmitted between an originating station and received by at least one destination station and is comprised of:
   a bit synchronization field;
   a message synchronization field; and
   a plurality of channel data blocks being comprised of:
   said first channel data block including: an information field including at least one command, a station address and a check word coded from the command and station address; and a parity field coded from the information field according to a predetermined code; the bits of the fields being interleaved such that consecutive bits of a field are separated by a predetermined number of bits;
   said second channel data block including: an information field including a block count; a message sequence number incremented for each message and a check word coded from the block count and message sequence number; and a parity field coded from the information field according to a predetermined code; the bits of the fields being interleaved such that consecutive bits of a field are separated by a predetermined number of bits; and
   said third and following channel data blocks each including: an information field including data; and a parity field coded from the information field; the bits of the fields being interleaved such that consecutive bits of a field are separated by a predetermined number of bits; and the information field of the last channel data block further including a check word coded from the data in the information field of the third and following channel data blocks.

2. A method for use in a signalling system for communicating messages via a communications medium between a primary station and a plurality of remote stations in a data communications system, said signalling system including a variable length message which is transmitted between an originating station and received by at least one destination station, said method for producing the variable length message comprised of the steps of:
   producing a bit synchronization field;
   producing a message synchronization field; and
   producing a plurality of channel data blocks;
   for said first channel data block, producing an information field including at least one command, a station address and a check word coded from the command and station address; coding a parity field from the information field according to a predetermined code; and interleaving the bits of the fields such that consecutive bits of a field are separated by a predetermined number of bits; and
   for said second channel data block, producing information field including at least a block count, a message sequence number incremented for each message and a check word coded from the block count and message sequence number; coding a parity field from the information field according to a predetermined code; and interleaving the bits of the fields such that consecutive bits of a field are separated by a predetermined number of bits;
   for said third and following channel data blocks, producing an information field including data; coding a parity field from the information field; and interleaving the bits of the fields such that consecutive bits of a field are separated by a predetermined number of bits; and for the information field of the last channel data block, coding a check word from the data in the information field of the third and following command data blocks.

3. A signalling system for communicating messages via a communications medium between a primary station and a plurality of remote stations in a data communications system, said signalling system including a variable length message which is transmitted between an originating station and received by at least one destination station and is comprised of:
   a bit synchronization field;
   a message synchronization field; and
   a plurality of channel data blocks being comprised of:
   said first channel data block including: an information field including at least one command, a station address and a check word coded from the command and station address; a parity field coded from the information field according to a predetermined code; and a channel state field dynamically changing to indicate whether the communications medium is busy or free; the bits of the fields being interleaved such that consecutive bits of a field are separated by a predetermined number of bits;
   said second channel data block including: an information field including at least a block count; a message sequence number incremented for each message and a check word coded from the block count and message sequence number; a parity field coded from the information field according to a predetermined code; and a channel state field dynamically changing to indicate whether the communications medium is busy or free; the bits of the fields being interleaved such that consecutive bits of a field are separated by a predetermined number of bits; and said third and following channel data blocks each including: an information field including data; a parity field coded from the information field; and a channel state field dynamically changing to indicate whether the communications medium is busy or free; the bits of the fields being interleaved such that consecutive bits of a field are separated by a predetermined number of bits; and the information field of the last channel data block further including a check word coded from the data in the information field of the third and following channel data blocks.

4. A method for use in a signalling system for communicating messages via a communications medium between a primary station and a plurality of remote stations in a data communications system, said signalling system including a variable length message which is transmitted between an originating station and received by at least one destination station, said method for producing the variable length message comprised of the steps of:

producing a bit synchronization field;
producing a message synchronization field; and
producing a plurality of channel data blocks;
for said first channel data block, producing an information field including at least one command, a station address and a check word coded from the command and station address; coding a parity field from the information field according to a predetermined code; dynamically producing a channel state field to indicate whether the communications medium is busy or free; and interleaving the bits of the fields such that consecutive bits of a field are separated by a predetermined number of bits; and for said second channel data block, producing an information field including at least a block count, a message sequence number incremented for each message and a check word coded from the block count and message sequence number; coding a parity field from the information field according to a predetermined code; dynamically changing a channel state field to indicate whether the communications medium is busy or free; and interleaving the bits of the fields such that consecutive bits of a field are separated by a predetermined number of bits;

for said third and following channel data blocks, producing an information field including data; coding a parity field from the information field; dynamically changing a channel state field to indicate whether the communications medium is busy or free; and interleaving the bits of the fields such that consecutive bits of a field are separated by a predetermined number of bits; and for the information field of the last channel data block, coding a check word from the data in the information field of the third and following command data blocks.

5. A remote station having a pre-assigned remote station address, for receiving variable length messages via a communications medium from a primary station in a data communications system, said variable length messages including a bit synchronization field, a message synchronization field, and a plurality of channel data blocks, each channel data block including an information field, a parity field coded from the information field according to a predetermined code and a channel state field dynamically changing to indicate whether or not the communications medium is busy or free, the information field of the first channel data block including a remote station address and a command, and the information field of the second channel data block including a block count indicating the number of following channel data blocks, said remote station comprising:

means for receiving variable length messages from the communications medium;
means for transmitting variable length message via the communications medium to the primary station;
register means for storing data;
memory means for storing data; and
processing means responsive to the channel state field in the received variable length messages for inhibiting transmissions by said transmitting means when the channel state field indicates that the communications medium is busy and responsive to the parity field for error-correcting the information field of each received variable length message, said processing means further being responsive to detection of the pre-assigned remote station address in the error-corrected information field for executing the command therein, error-correcting and storing the block count of the information field of the second received channel data block in the register means, and error-correcting and storing the contents of the information field of the following received channel data blocks in the memory means until a number of channel data blocks substantially the same as the block count in the register means have been received.

6. A method for receiving variable length messages communicated via a communications medium of a data communications system from a primary station to a remote station having a pre-assigned remote station address, said remote station including receiving means, transmitting means, register means and memory means, said variable length messages including a bit synchronization field, a message synchronization field, and a plurality of channel data blocks, each channel data block including an information field, a parity field coded from the information field according to a predetermined code and a channel state field dynamically changing to indicate whether or not the communications medium is busy or free, the information field of the first channel data block including a remote station address and a command, and the information field of the second channel data block including a block count indicating the number of following channel data blocks, said method comprising the steps of:

receiving variable length messages from the communications medium; and
inhibiting transmissions by said transmitting means when the channel state field of a received variable length message indicates that the communications medium is busy;
error-correcting the information field of each received variable length message in response to the parity field; and
in response to detection of the pre-assigned remote station address in the error-corrected information field, executing the command therein, error-correcting and storing the block count of the information field of the second received channel data block in the register means, and error-correcting and storing the contents of the information field of the following received channel data blocks in the memory means until a number of channel data blocks substantially the same is the block count in the register means have been received.

7. The remote station according to claim 5, wherein said processing means applies variable length messages to the transmitting means.

8. The remote station according to claim 5, wherein said processing means applies variable length messages to the transmitting means, said processing means dynamically changing the channel state field to indicate pre-selected status of said remote station.

9. The remote station according to claim 5, wherein said processing means interleaves and applies bits of variable length messages to the transmitting means.

10. The remote station according to claim 5, wherein said communications medium comprises a radio channel, said receiving means includes radio receiving means coupled to antenna means for receiving variable length messages from the radio channel, and said transmitting includes radio transmitting means coupled to the antenna means for transmitting variable length messages via the radio channel.

* * * * *